United States Patent
Perkins

[11] 3,841,414
[45] Oct. 15, 1974

[54] GARDEN TOOL
[76] Inventor: William L. Perkins, 64 A Sunnyside Ave., Holden, Mass. 01520
[22] Filed: Dec. 22, 1972
[21] Appl. No.: 317,619

[52] U.S. Cl. ................................ 172/371, 30/314
[51] Int. Cl. ............................................. A01b 1/16
[58] Field of Search ....... 172/371, 720; 30/314, 317

[56] References Cited
UNITED STATES PATENTS

| | | | |
|---|---|---|---|
| 406,737 | 7/1889 | Johnson | 172/371 |
| 1,127,015 | 2/1915 | Keeler | 30/314 X |
| 1,529,781 | 3/1925 | Foster | 172/371 |
| 1,799,045 | 3/1931 | Hall | 30/314 |
| 2,019,357 | 10/1935 | Oestreich | 172/371 |
| 2,184,217 | 12/1939 | Guynn | 172/371 |

Primary Examiner—Robert E. Pulfrey
Assistant Examiner—Paul T. Sewell
Attorney, Agent, or Firm—Norman S. Blodgett; Gerry A. Blodgett

[57] ABSTRACT

A garden tool, comprising a shaft, a handle at one end of the shaft, and a projection at the other end, perpendicular to the shaft. The projection is planar being skewed relative to the long axis of the shaft and carrying a cutting edge at its free end and on an edge.

1 Claim, 3 Drawing Figures

PATENTED OCT 15 1974　　　3,841,414
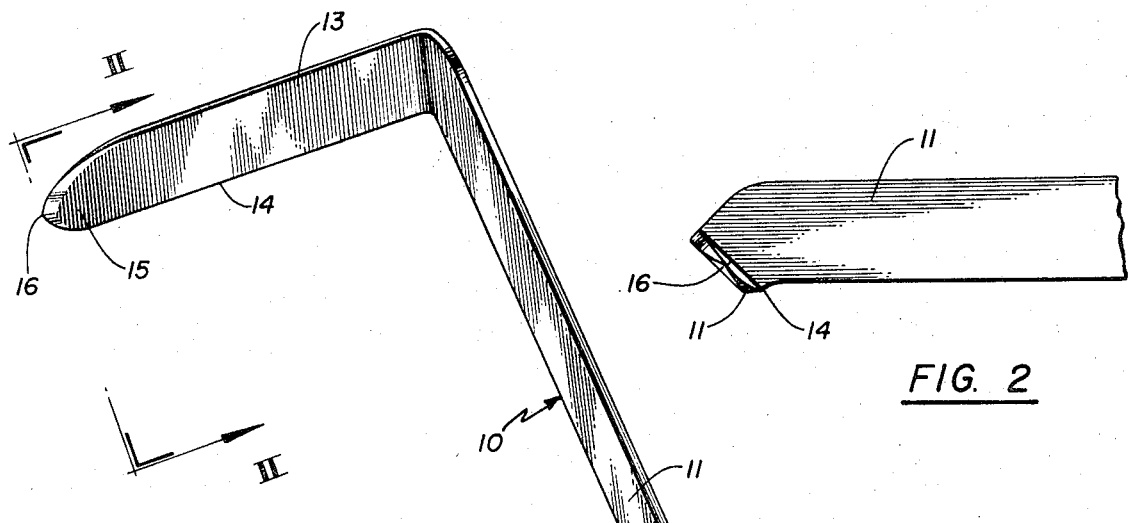
FIG. 2
FIG. 1
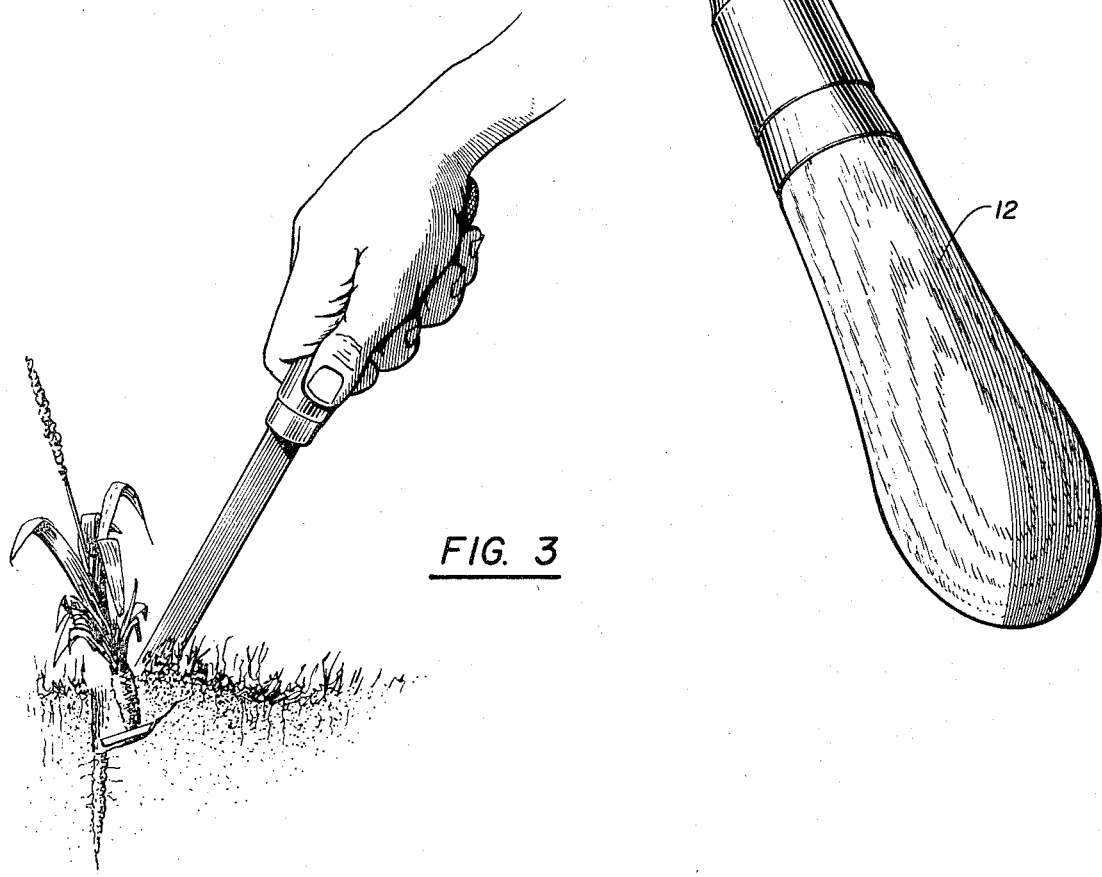
FIG. 3

GARDEN TOOL

BACKGROUND OF THE INVENTION

A smooth weed-free garden is the dream of nearly every self-respecting homeowner. Likewise, gardeners, amateur and professional, worry about the presence of weeds among their produce. However, the fact that weed extraction is a laborious, unexciting, and uncomfortable task, and that its unskillful execution can result in damage to surrounding vegetation was recognized even as far back as biblical times. Today, weeding is considered one of the most onerous tasks involved in the gardening and landscaping business. Furthermore, what is only distasteful and time-consuming to the amateur horticulturist, means lost dollars and unhappy laborers to the professional farmer or landscaper.

The main reason that weed extraction is a problem, involves the fact that simply pulling off the leaf surface growth allows the weed to regrow to its former size in a very short time. This fact is due to the location of the plants growth center, which is at or slightly below the surface. To kill the plant or retard its regrowth to any significant degree, the root must be extracted to a point at least a few inches below the surface. Traditionally, the extraction was done by carefully grasping the leaf cluster and pulling upward. It was often the case that leaves were not sufficiently connected to the root to allow extraction resulting in a handful of leaves and a weed root that either had to be dug up or would soon releaf.

Various tools have been designed to make the extracting task easier and eliminate the first-try failure that results in the need to dig up the root. The old designs generally involved either a pincher arrangement for grasping the head of the root, or a forked arrangement that came up under the root head and pulled the root out like a claw hammer and a nail. The old designs had many drawbacks. If effective, they proved too complex to be manufactured at a marketable price, or if they could be made at reasonable cost, they simply did not do the job. These and other difficulties experienced with the prior art devices have been obviated in a novel manner by the present invention.

It is, therefore, an outstanding object of the invention to provide a garden tool which can be used to quickly and easily extract weeds from lawns or gardens.

Another object of this invention is the provision of a garden tool which easily severs weed roots below the ground level.

A further object of the present invention is the provision of a garden tool which extracts weeds without resulting in extensive damage to the surrounding vegetation.

It is another object of the instant invention to provide a garden tool which is simple in construction, inexpensive to manufacture, and capable of a long and useful life.

With these and other objects in view, as will be apparent to those skilled in the art, the invention resides in the combination of parts set forth in the specification and covered by the claims appended hereto.

SUMMARY OF THE INVENTION

This invention involves a garden tool for extracting weeds from the ground. It includes a shaft, a handle at one end of the shaft and a projection at the other end of the shaft. The projection is perpendicular to the shaft, is planar and is skewed with respect to the shaft, and has a sharpened end and edge.

BRIEF DESCRIPTION OF THE DRAWINGS

The character of the invention, however, may be best understood by reference to one of its structural forms, as illustrated by the accompanying drawings, in which:

FIG. 1 is a perspective view of a device embodying the principles of the present invention, FIG. 2 is a view taken on the line II—II of FIG. 1, and FIG. 3 is a view of the device in operation.

DESCRIPTION OF THE PREFERRED EMBODIMENT

Referring first to FIG. 1, wherein are best shown the general features of the present invention, the garden tool, indicated generally by the numeral 10, is shown as having an elongated shaft 11, a handle 12, and an elongated projection 13 having a lower edge 14 and an upper edge on the opposite side thereof. The shaft and projection are formed of ⅛ inch thick steel plate, about ⅝ inch wide. The projection extends from the shaft so that its longitudinal dimension is generally perpendicular to the longitudinal dimension and the plane of the shaft. The plane of the projection is skewed with respect to the longitudinal dimension of the shaft so that it forms an angle of about 45° with that dimension. The lower or inside edge 14, and the end 15 of the projection are sharpened and a point 16 is formed at the end 15. The handle 12 is fixed to the shaft so that it cannot be pulled from the end of the shaft.

The use and operation of the invention will now be readily understood in view of the above description. Referring to FIG. 3, the operator grasps the tool handle 12 in his right hand, and holds the shaft parallel to the ground with the projection perpendicular to the ground. Facing the weed, the operation drives the point 16 into the ground slightly to the right and rear of the weed. Simultaneously, the shaft is twisted clockwise. As a result of this movement, the edge 14 is about an inch below and parallel to the surface of the ground and slightly behind the root. The operation then pulls the tool toward himself. This action severs the root well below the surface and opens the ground around the weed. The operator can then easily pluck the released weed from the ground. The tool is retracted from the ground with an upward movement and counterclockwise twist and the ground is pressed back into place.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A garden tool, comprising:
   a. an elongated, plate-like shaft having a first end, a second end, and a side surface,
   b. a handle fixed to the first end, and
   c. a plate-like projection fixed to and extending from the second end of the shaft, the projection having upper and lower edges and a plane surface facing the handle and the longitudinal dimension of the projection being perpendicular to the said side surface of the shaft, and the projection having a cutting edge on the lower edge parallel to the longitudinal dimension of the projection and facing the handle, the plane surface of the projection forming an angle of 135° with respect to the edges of the shaft, so that the cutting edge is directed toward the handle, the projection having a pointed outer end formed from two inwardly-inclined edges meeting at the midpoint between the upper and lower edges, the shaft and projection being formed by bending a single piece of plate.

* * * * *